United States Patent
Hou et al.

(10) Patent No.: US 11,174,624 B2
(45) Date of Patent: Nov. 16, 2021

(54) METHOD FOR IDENTIFYING NUMBER OF SHOVELING-AND-LOADING PROCESSES OF LOADER AND DEVICE FOR IDENTIFYING THE NUMBER OF THE SHOVELING-AND-LOADING PROCESSES OF THE LOADER

(71) Applicant: XIAMEN UNIVERSITY, Xiamen (CN)

(72) Inventors: Liang Hou, Xiamen (CN); Shaojie Wang, Xiamen (CN); Xiangjian Bu, Xiamen (CN)

(73) Assignee: XIAMEN UNIVERSITY, Xiamen (CN)

( * ) Notice: Subject to any disclaimer, the term of this patent is extended or adjusted under 35 U.S.C. 154(b) by 760 days.

(21) Appl. No.: 16/066,991

(22) PCT Filed: Jul. 3, 2017

(86) PCT No.: PCT/CN2017/091425
§ 371 (c)(1),
(2) Date: Jun. 28, 2018

(87) PCT Pub. No.: WO2018/014716
PCT Pub. Date: Jan. 25, 2018

(65) Prior Publication Data
US 2020/0277756 A1   Sep. 3, 2020

(30) Foreign Application Priority Data

Jul. 22, 2016 (CN) .......................... 201610585199.8

(51) Int. Cl.
*E02F 9/26* (2006.01)
*G01L 19/12* (2006.01)
*G06K 9/62* (2006.01)

(52) U.S. Cl.
CPC ................ *E02F 9/26* (2013.01); *G01L 19/12* (2013.01); *G06K 9/6288* (2013.01)

(58) Field of Classification Search
CPC .......... E02F 9/26; G01L 19/12; G06K 9/6288
(Continued)

(56) References Cited

U.S. PATENT DOCUMENTS 5,220,968 A   6/1993   Weber
6,167,336 A   12/2000  Singh et al.
(Continued)

FOREIGN PATENT DOCUMENTS

CN    101788398 A   7/2010
CN    102493522 A   6/2012
(Continued)

OTHER PUBLICATIONS

Sakai, Tomoaki, Operation System for Hydralic Excavator for Deep Trench Works, 5th International Symposium On Robotics in Construction Jun. 6-8, 1988, pp. 710-716 (Year: 1988).*

(Continued)

*Primary Examiner* — Aditya S Bhat
(74) *Attorney, Agent, or Firm* — Cooper Legal Group, LLC (57) ABSTRACT

A method and the device of the working bucket number identification technology during the shoveling-and-loading process of the loader uses multi-sensor fusion technology for the three kinds of pressure sensors during the shoveling-and-loading process of the loader to realize the automatic identification of the bucket number during the shoveling-and-loading process. It can effectively improve and ensure the accuracy of the test data, while effectively preventing drivers from overworking. The method and device is also beneficial to the recognition of the loader working stage, and provides a good foundation for accurately identifying the (Continued)

working stage and realizing the dynamic prediction and control of the working process.

19 Claims, 1 Drawing Sheet

(58) Field of Classification Search
USPC .......................................................... 702/150
See application file for complete search history.

(56) References Cited

U.S. PATENT DOCUMENTS

| | | | |
|---|---|---|---|
| 7,464,063 B2 * | 12/2008 | Vatchkov | G05B 23/021 706/45 |
| 2009/0217654 A1 | 9/2009 | Iwamoto | |

FOREIGN PATENT DOCUMENTS

| | | |
|---|---|---|
| CN | 102877500 A | 1/2013 |
| CN | 103293006 A | 9/2013 |
| CN | 103615025 A | 3/2014 |
| CN | 104634400 A | 5/2015 |
| CN | 106125612 A | 11/2016 |
| JP | 2013056743 A | 3/2013 |

OTHER PUBLICATIONS

"Construction and Analysis on Typical Working Cycle of Wheel Loader", Oct. 2015, Ma Xiangming, Sun Xia, Chang Qiang, Journal of Shandong University (Engineering Science), vol. 45, No. 5, 7 pgs.

* cited by examiner

METHOD FOR IDENTIFYING NUMBER OF SHOVELING-AND-LOADING PROCESSES OF LOADER AND DEVICE FOR IDENTIFYING THE NUMBER OF THE SHOVELING-AND-LOADING PROCESSES OF THE LOADER

This application is a national stage entry of International Patent Application PCT/CN2017/091425, filed on Jul. 3, 2017, which claims priority to Chinese patent application number 201610585199.8, filed on Jul. 22, 2016. International Patent Application PCT/CN2017/091425 and Chinese patent application 201610585199.8 are incorporated herein by reference.

TECHNICAL FIELD

The present invention relates to the identification technology of the working bucket number during the shoveling-and-loading process of construction vehicles, more specifically to a method of identifying the working bucket number during the shoveling-and-loading process of the loader, and a device for identifying the bucket number during the shoveling-and-loading process of the loader.

BACKGROUND OF THE INVENTION

Loaders, as one of the largest family members in construction machinery, do not only occupy the largest amount of construction machinery, but also have the largest sales volume. With the increasing demand on the reliability, maintainability, safety, fuel economy and intelligence of the loader, and more experimental research is needed, how to achieve the intelligent statistics of sample number in the experimental process will be an issue of increasing concern. Moreover, the recognition of bucket number (working cycle) is of great importance to loader process control and is the basis of loader's process control.

Sample number, an important parameter of the operation spectrum acquisition experiment, determines whether the operation data obtained can be used. The load of the original loader is a random variable load, usually, the load eigenvalues are extracted from the random loads of finite sample length by means of probability statistics and sample estimation. The accuracy of the load eigenvalues obtained by loads with different sample lengths varies with the sample size. The accuracy of the load eigenvalues will increase with the growth of the sample length, which lead to an increase of sample extraction workload, work difficulty and so on. When the sample length increases to a certain extent, the added value of accuracy is limited. Therefore, in the premise of meeting the accuracy, make the sample number of the sample lengths need to accurately measure the least.

The sample number for the loader is the working bucket number during the shoveling-and-loading process. The traditional measurement of the working bucket number adopts the method of fixed-time estimation or manual counting, which results in too few or too many samples, and low experimental accuracy or large workload and high work difficulty. And due to the complicated working conditions of the loader, the time of the working cycle varies greatly and the sample amplitude changes greatly.

SUMMARY OF THE INVENTION

The present invention, whose purpose is to overcome the deficiencies of the prior art, provides a method of identifying the bucket number that can accurately obtain the sample number required and be applied directly to the shoveling-and-loading process of the loader, and a device for identifying the bucket number during the shoveling-and-loading process of the loader.

The technical scheme of the present invention is as follows:

A method of identifying the working bucket number during the shoveling-and-loading process of the loader is described as follows:
1) Collecting the working oil pump pressure value, the pressure value of the large cavity of the moving arm and the pressure value of the large cavity of the rotating bucket;
2) The collected pressure values are fuzzified, and the pressure value is transformed into three kinds of fuzzy quantities: the non-work, the state to be determined and the work;
3) The fusion value is obtained by making weight fusion of the obtained fuzzy quantity;
4) Based on the decision analysis of the fusion value, the division basis of the working cycle is obtained, and thus the shoveling-and-loading bucket number is made.

As a preference, in the step 1), preprocessing the collected working oil pump pressure value, pressure value of the large cavity of the moving arm and pressure value of the large cavity of the rotating bucket, comprising numerical normalization and data filtering.

As a preference, the numerical normalization is as follows:

An original value x of the data sequence D is mapped to the value x* in the interval [0, 1] by Min-max normalization, the formula is:

$$x^* = \frac{x - D_{min}}{D_{max} - D_{min}};$$

Wherein, $D_{min}$ and $D_{max}$ are the minimum and maximum values of the data sequence, respectively.

As a preference, threshold filtering the data obtained after numerical normalization, the threshold function is:

$$\hat{w}_{j,k} = \begin{cases} w_{j,k}(1-u) + u*\text{sign}(w_{j,k})\left(|w_{j,k}| - \dfrac{\lambda}{1+\exp\left(\left|\dfrac{w_{j,k}}{\lambda}\right|^n - 1\right)}\right), & |w_{j,k}| \geq \lambda \\ w_{j,k}(1-u), & |w_{j,k}| < \lambda \end{cases};$$

Wherein, u and n are the adjustment coefficient, u is in the range of [0, 1], n is a non-zero natural number; $\lambda$ is a threshold and is selected according to the actual needs; $w_{j,k}$ is the original wavelet coefficient, and $\hat{w}_{j,k}$ is the estimated wavelet coefficient.

As a preference, in the step 2), the fuzzy membership function used in the fuzzification process is s-type, the formula is as follows:

$$A(x; a, b, c) = \begin{cases} 0, & x \leq a \\ 2\left(\dfrac{x-a}{c-a}\right), & a < x \leq b \\ 1 - 2\left(\dfrac{x-c}{c-a}\right), & b < x \leq c \\ 1, & x > c \end{cases};$$

Wherein, according to the fuzzy membership function and the pressure curve actually collected, the values of a, b and c are determined, and a<c, $$b = \frac{a+c}{2}.$$

wherein, A(x;a, b, c) is a fuzzy processing formula, x is the initialization value, a, b, c are variable parameters, which are used to delimit the fuzzy intervals.

As a preference, in the step 3), customizing the weighting factor of the working oil pump pressure value, the pressure value of the large cavity of the moving arm and the pressure value of the large cavity of the rotating bucket. The local estimates corresponding to the working oil pump pressure value, the pressure value of the large cavity of the moving arm and the pressure value of the large cavity of the rotating bucket is obtained, and all the local estimates are weighted to get the global estimate.

As a preference, the fusion pressure value $\hat{x}$ and weighting factor satisfy the following rules:

$$\begin{cases} \hat{x} = \sum_{i=1}^{3} W_i x_i \\ \sum_{i=1}^{3} W_i = 1 \end{cases};$$

Wherein, $W_i$ is the weighting factor of the working oil pump pressure value, the pressure value of the large cavity of the moving arm and the pressure value of the large cavity of the rotating bucket.

As a preference, the weighted factor is determined by means of the average, and the value of the fusion pressure is as follows:

$$\hat{x} = \frac{1}{3}\sum_{i=1}^{3} x_i.$$

As a preference, in the step 4), the fuzzy logic C mean clustering algorithm is used to make decision analysis, after getting the cluster center value, take the lowest two cluster center values for averaging; during the working cycle, the time of the continuous line segments lower than the average value is cleared, and the time of the continuous line segment above the average value is the time length of the work and non-work determined in each working cycle, and then the number of the working cycles is counted, that is the working bucket number.

A device of identifying the bucket number during the shoveling-and-loading process of the loader comprises the microprocessor, a working oil pump pressure sensor connected to the microprocessor, the pressure of the large cavity of the moving arm sensor and the pressure of the large cavity of the rotating bucket sensor, communication module, the bucket number alarm module and the human-computer interaction module;

The working oil pump pressure sensor, the pressure of the large cavity of the moving arm sensor and the pressure of the large cavity of the rotating bucket sensor are respectively used to collect the working oil pump pressure value, the pressure value of the large cavity of the moving arm and the pressure value of the large cavity of the rotating bucket;

The communication module is used for remote reading and setting of the bucket number and bucket number alarm threshold; The bucket number alarm module is used to remind the driver has completed the corresponding bucket shoveling-and-loading operation.

The human-computer interaction module is used to set the bucket number and bucket number alarm threshold for the driver or tester;

The microprocessor executes the identification method of the bucket number during the shoveling-and-loading process of the loader.

The beneficial effects of the present invention are as follows:

The method and the device of the present invention adopt the multi-sensor fusion technology for the three kinds of pressure sensors during the shoveling-and-loading process of the loader to realize the automatic identification of the bucket number during the shoveling-and-loading process, which can effectively improve and ensure the accuracy of the test data, while effectively preventing drivers from overworking. The present invention is also beneficial to the recognition of the loader working stage, and provides a good foundation for accurately identifying the working stage and realizing the dynamic prediction and control of the working process.

In the present invention, the method of identifying the working bucket number (which may also be referred to a working cycle) is not only significant for the accurate measurement of the sample number in the performance test process, but also important for the latter part of the sample statistics. It realizes the stage division of the working cycle and provides convenience for the later statistics.

The implementation of the present invention allows the experimenter to accurately obtain the required sample number, improve and ensure the accuracy of the test, while avoiding the driver wasting time and manpower due to the large number of samples collected.

DETAILED DESCRIPTION OF THE EMBODIMENTS

The present invention is further described below with reference to the figures and the preferred embodiments.

In order to solve the problem of intelligent identification difficulty in the working bucket number in the prior art, the present invention provides a dynamic on-line bucket number identify method and device that can be directly applied to a loader, which allows the experimenter to accurately obtain the required sample number, improve and ensure the accuracy of the test, while avoiding the driver wasting time and manpower due to the large number of samples collected.

During the operation of engineering vehicles, the changes of working oil pump pressure, the pressure of the large cavity of the moving arm and the pressure of the large cavity of the rotating bucket are closely related to the working stage and have their own characteristics. In addition, due to the different working conditions, complex working conditions and different driving styles, the pressure curves in the same stage have different changes, and the time range of each working stage can not be determined by a single amount. In order to overcome this problem, the present invention proposes a method for identifying the working bucket number of a loader during shoveling-and-loading process based on the fuzzy logic multi-sensor data fusion method. The steps are as follows:

1) Collecting the working oil pump pressure value, the pressure value of the large cavity of the moving arm and the pressure value of the large cavity of the rotating bucket; In order to get more accurate data, preprocessing the collected working oil pump pressure value, pressure value of the large cavity of the moving arm and pressure value of the large cavity of the rotating bucket, comprising numerical normalization and data filtering (such as wavelet filtering).
2) The collected pressure values are fuzzified, and the pressure value is transformed into three kinds of fuzzy quantity, that is, the non-work, the state to be determined and the work;
3) The fusion value is obtained by making weight fusion of the obtained fuzzy quantity;
4) Based on the decision analysis of the fusion value with the fuzzy logic C-means clustering algorithm, the division basis of the working cycle is obtained, and thus the shoveling-and-loading bucket number is made.

Figure 1:
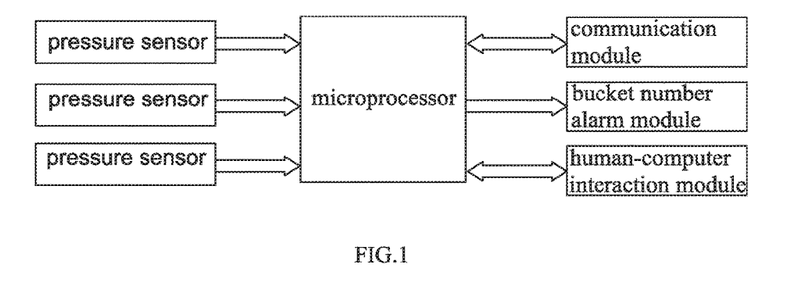
FIG. 1 is a principle block diagram of the identification device of the present invention.

In the embodiment, an device of identifying the bucket number during the shoveling-and-loading process of the loader, as shown in FIG. 1, comprises the microprocessor 1, a working oil pump pressure sensor 2 connected to the microprocessor, the pressure of the large cavity of the moving arm sensor 3 and the pressure of the large cavity of the rotating bucket sensor 4, communication module 5, the bucket number alarm module 6 and the human-computer interaction module 7.

The working oil pump pressure sensor 2, the pressure of the large cavity of the moving arm sensor 3 and the pressure of the large cavity of the rotating bucket sensor 4 are respectively used to collect the working oil pump pressure value, the pressure value of the large cavity of the moving arm and the pressure value of the large cavity of the rotating bucket; The sensor can choose current type output or voltage output according to the requirement of application.

The communication module 5, which comprises three communication modes: RS232, RS485 and CAN, is used for the communication between microprocessor 1 and other devices. The main function is to send out the information of operation bucket number and set and control remote parameters, such as remote reading and set bucket number and bucket number alarm thresholds.

The bucket number alarm module 6 is used to output an alarm, the alarm to remind the driver has completed the operation of the bucket number or finish all the shovel operations.

The human-computer interaction module 7 is used by field operators for manual setup of the identification device and status display of identification device. The driver or tester set bucket number and bucket number alarm thresholds through the human-computer interaction module. The human-computer interaction module 7 can also comprise a display and keyboard, the keyboard for information input, and the display for information display.

The microprocessor 1 is the control core of the entire identification device. A series of processor chips, such as STM, PIC, ARM, can be selected. The main effects comprise interaction, control and recognition algorithm, and execute the method of identifying the working bucket number during the shoveling-and-loading process.

Figure 2:
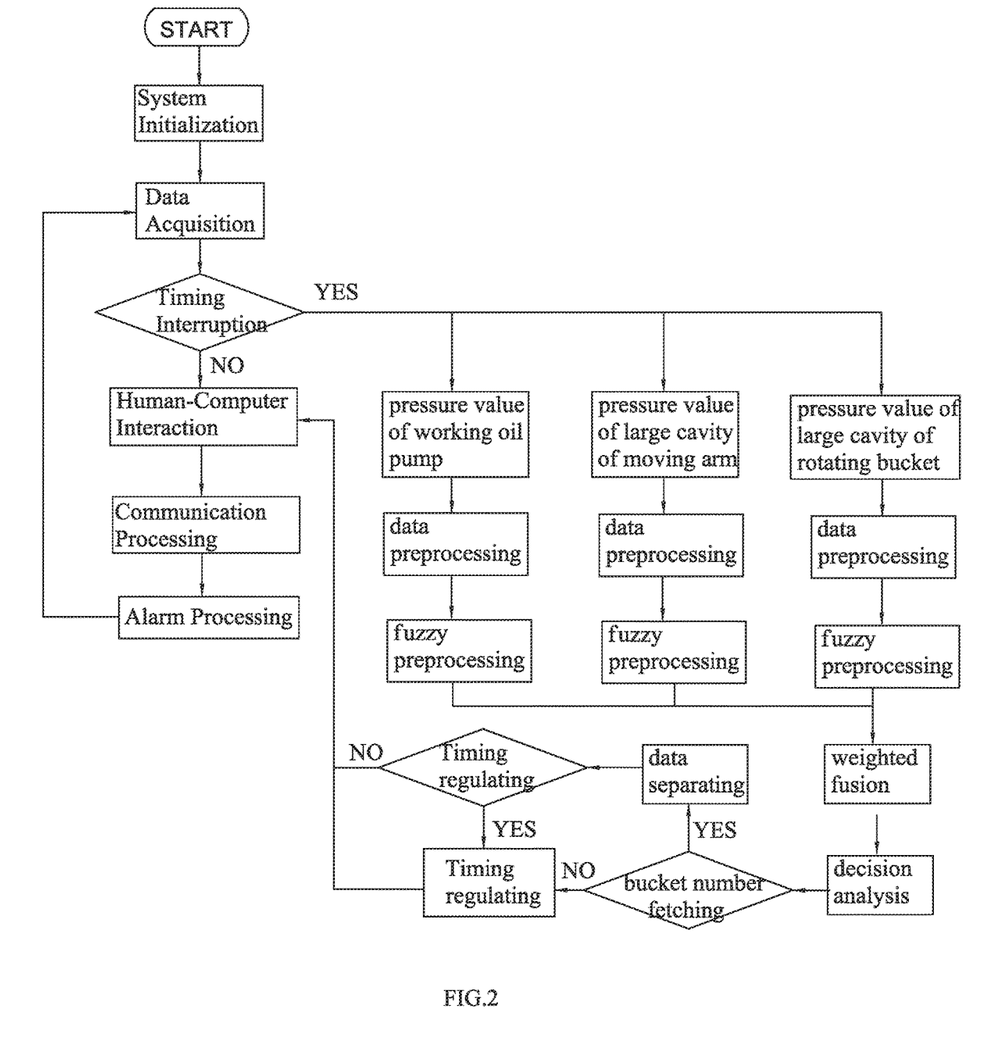
FIG. 2 is a flow chart of the program design of the identification method of the present invention.

FIG. 2 is an application of the embodiment of the method of identifying the working bucket number during the shoveling-and-loading process of the present invention. The method of identifying the working bucket number is embedded in the microprocessor to execute:

System initialization: the microprocessor is energized and the program starts to execute. The microprocessor system initialization first, which comprises the acquisition port AD initialization, timing judgment initialization, communication module initialization, bucket number alarm module initialization and human-computer interaction module initialization.

Data acquisition: after the system is initialized, data acquisition will start. At this time, the microprocessor collects and records the value from the working oil pump pressure sensor, the pressure of the large cavity of the moving arm sensor and the pressure of the large cavity of the rotating bucket sensor through the AD acquisition port. Due to the slowly change of the pressure the sampling rate of data acquisition is 20 Hz, and the obtained data is processed according to the median mean smoothing filter to obtain a 10 Hz signal.

Interruption judgment: determine whether the device detection produces a timing interruption. The interruption interval of the initial setting of the timer is 30 seconds, the time is the basic time for completing one working bucket at the test site.

The human-computer interaction: if there is no timing interrupt, then enter the processing program of the human-computer interaction module. Detect whether there is man-machine interaction, if there is a response operation, if not then enter the processing program of the communication module. Detect whether there is a device connection, if there is sent device status information and bucket number. After the processing is completed, enter the processing program of the alarm module, and the related alarm information is output;

Fuzzy processing: if there is a timing interrupt, start the data processing, preprocessing and fuzzy the 10 Hz pressure signals collected by the microprocessor respectively.

Weighted fusion: weighted fusing the obtained multiple fuzzy values. And the values obtained by the weighted fusion are decision analyzed.

The core of the identification method of the present invention lies in fuzzification and decision analysis.

The identification method is as follows:
1. Preprocessing the data, comprising numerical normalization and data filtering. As a preference, the numerical normalization is as follows:
An original value x of the data sequence D is mapped to the value x* in the interval [0, 1] by Min-max normalization, the formula is:

$$x^* = \frac{x - D_{min}}{D_{max} - D_{min}};$$

Wherein, $D_{min}$ and $D_{max}$ are the minimum and maximum values of the data sequence, respectively.

By numerical normalization, the pressure value is converted to a value between [0, 1], which is beneficial to reduce the amount of data computation and avoid data overflow.

As a preference, threshold filtering the data obtained after numerical normalization, the threshold function is:

$$\hat{w}_{j,k} = \begin{cases} w_{j,k}(1-u) + u*\text{sign}(w_{j,k})\left(|w_{j,k}| - \dfrac{\lambda}{1+\exp\left(\left(\left|\dfrac{w_{j,k}}{\lambda}\right|^n - 1\right)\right)}\right), & |w_{j,k}| \geq \lambda \\ w_{j,k}(1-u), & |w_{j,k}| < \lambda \end{cases} ;$$

Wherein, u and n are the adjustment coefficient, u is in the range of [0, 1], n is a non-zero natural number; λ is a threshold and is selected according to the actual needs; $w_{j,k}$ is the original wavelet coefficient, $\hat{w}_{j,k}$ and is the estimated wavelet coefficient.

The filtering effect of the pressure value obtained through the threshold function filtering is the best, the described filtering method is particularly suitable for filtering the pressure signal of the loader.

2. Fuzzy Processing

Pressure value data obtained after preprocessing, continue to fuzzy processing operation. The work state of each pressure sensor data is described by 3 kinds of fuzzy sets: non-work, state to be determined, work, which are marked as $\{W_{-1}, W_0, W_1\}$. The fuzzy membership function used in the fuzzification process is s-type, the formula is as follows:

$$A(x; a, b, c) = \begin{cases} 0, & x \leq a \\ 2\left(\dfrac{x-a}{c-a}\right), & a < x \leq b \\ 1 - 2\left(\dfrac{x-c}{c-a}\right), & b < x \leq c \\ 1, & x > c \end{cases} ;$$

Wherein, according to the fuzzy membership function and the pressure curve actually collected, the values of a, b and c are determined, and a<c, $$b = \dfrac{a+c}{2}.$$

wherein, A(x; a, b, c) is a fuzzy processing formula, x is the initialization value, a, b, c are variable parameters, which are used to delimit the fuzzy intervals.

The fuzzy membership function of the working oil pump pressure is shown as follows, wherein a=0.2, b=0.3, c=0.4.

$$A(x) = \begin{cases} 0, & x \leq 0.2 \\ 10x - 2, & 0.2 < x \leq 0.3 \\ 5 - 10x, & 0.3 < x \leq 0.4 \\ 1, & x > 0.4 \end{cases}$$

The fuzzy membership function of the pressure of the large cavity of the moving arm is shown as follows, wherein a=0.2, b=0.3, c=0.4.

$$A(x) = \begin{cases} 0, & x \leq 0.2 \\ 5x - 1, & 0.2 < x \leq 0.4 \\ 4 - 5x, & 0.4 < x \leq 0.6 \\ 1, & x > 0.6 \end{cases}$$

The fuzzy membership function of the pressure of the large cavity of the rotating bucket is shown as follows, wherein a=0.2, b=0.4, c=0.6.

$$A(x) = \begin{cases} 0, & x \leq 0.2 \\ 10x - 2, & 0.2 < x \leq 0.3 \\ 5 - 10x, & 0.3 < x \leq 0.4 \\ 1, & x > 0.4 \end{cases}$$

The normalized data obtained after preprocessing is X, the fuzzy membership function is used to process the normalized data X, and a new fuzzy data sequence Y=X*A(x) is obtained.

The value of the new data sequence is still in [0,1], according to the definition of fuzzy sets $\{W_{-1}, W_0, W_1\}$, let the value of Y(i) in Y(i)>=0.75 take −1, Y(i) in Y(i)<=0.25 take 1, other take the zero value. Through this method, the current pressure value is divided into three fuzzy spaces, and then weighted fusion.

3. Weighted Fusion

The core idea of the weighted fusion algorithm of sensor data is to take into account the local estimation of each sensor. According to certain principles, the weighting factor is customized for the working oil pump pressure value, the pressure value of the large cavity of the moving arm and the pressure value of the large cavity of the rotating bucket, and the local estimation of the corresponding pressure value is obtained. Weighted synthesis of all local estimates and then get the global estimation. The weighting factors of the working oil pump pressure value, the pressure value of the large cavity of the moving arm and the pressure value of the large cavity of the rotating bucket, corresponding to the working oil pump pressure sensor, the pressure of the large cavity of the moving arm sensor and the pressure of the large cavity of the rotating bucket sensor respectively are $W_1$, $W_2$, $W_3$, and the fusion pressure value $\hat{x}$ and weighting factor satisfy the following rules:

$$\begin{cases} \hat{x} = \sum_{i=1}^{3} W_i x_i \\ \sum_{i=1}^{3} W_i = 1 \end{cases} ;$$

Wherein, $W_i$ is the weighting factor of the working oil pump pressure value, the pressure value of the large cavity of the moving arm and the pressure value of the large cavity of the rotating bucket.

Since the three kinds of pressure sensors are independent of each other, and the factors that reflect the operation process of the engineering vehicles are basically the same. Therefore, the weighting factor is determined by means of the average method, that is, assuming that the weighting factors of each sensor are approximately equal, and the value of the fusion is as follows:

$$\hat{x} = \dfrac{1}{3}\sum_{i=1}^{3} x_i.$$

The fusion method is used to fuse the three pressure sensors to obtain a set of fused pressure sensor values, then make a decision analyzing to the set of pressure sensor values.

4. Decision Analysis

The decision analysis uses the fuzzy logic C mean clustering (FCM) algorithm. For the obtained fusion pressure sensor value, it can be seen that it has obvious periodic characteristics. The fusion pressure sensor of the prior art is divided into three types of conditions, that is, work, non-work, state to be determined. In accordance with the actual needs, it is divided into two kinds of situations: work and non-work. The value of the work segment and the non-work segment is continuous, therefore the time of each continuous line segment can be counted. According to the time of continuous line segments and fusion pressure values to distinguish the work and non-work states, the working cycle can also be distinguished.

The principle of the time statistics of continuous line segments is to start counting from the starting point of the segment and count each segment point. When reaching the turning point of another continuous line segments, record the total number of points in the previous continuous line segment and the position of the last point, and then start another time statistics of continuous line segments. The statistics of the position of the last point of each continuous line segments is for the purpose of dividing the working cycles. After the time statistics of the continuous line segments are completed, the continuous line segments are further differentiated according to the work state and the non-work state. At last, the time statistic values of the continuous line segments in the work state and non-work state are normalized, that is, it only shows the time ratio of the continuous line segments in each state.

In order to carry on fuzzy logic C-means clustering analysis for the length of each line segment, the time lengths of the work and the non-work state of each line segments are extracted separately. Set the corresponding transversal coordinates are 1 to construct the sample set of time length of the non-work $X_1$ and work state $X_2$, that is, $X\{\{1,t_1\}, \{1,t_2\}, \{1,t_3\}, \ldots, \{1,t_n\}\}$. After the sample set is constructed, the following FCM algorithm operations are started:

1) Initialization: given the clustering number c ($2 \leq c \leq n$), due to the special conditions such as temporary parking in the non-work state, the length of individual time is longer. Therefore, the value of clustering number of the non-work sample set is 3, that is, $c_1=3$; the length of time in the work state are more consistent, set the value of clustering number of the sample set is 2, that is, $c_2=2$. The fuzzy weight m of both takes the normal value 2; set the iteration stop threshold ε to 0.002; the number of iterations l is set to 2000, and the clustering prototype $V^{(l)}(l=0)$ is initialized.

2) According to $V^{(l)}$, the fuzzy partition matrix $U^{(l+1)}$ is updated according to the following formula:

$$u_{ij}^{(l+1)} = \left( \frac{d_{ij}^{(l)}}{\sum_{j=1}^{c} d_{ij}^{(l)}} \right)^{\frac{2}{m-1}}$$

3) According to $U^{(l)}$, calculate the new cluster center matrix $V^{(l+1)}$ according to the following formula:

$$v_i^{(l+1)} = \left( \frac{\sum_{i=1}^{n} (u_{ij}^{(l)})^m x_i}{\sum_{i=1}^{n} (u_{ij}^{(l)})^m} \right)^{\frac{2}{m-1}}$$

4) Judging threshold, according to the threshold ε, if, $\|V^{(l+1)}-V^{(l)}\| \leq \varepsilon$, then stop the iteration, otherwise l=l+1, and jump to the second step to continue iteration. According to the algorithm mentioned above, the cluster center value is obtained. According to the obtained clustering results, taking the average value of the lowest two clustering center value. During the working cycle, the time of the continuous line segments lower than the average value is cleared, and the time of the continuous line segment above the average value is the time length of the work and non-work determined in each working cycle. In order to further draw the operation cycle, summation calculates the last time points of the continuous line segments of the work state and the non-work state, the midpoint of the two as the segment point of the last working cycle. Then the number of the working cycles is counted, that is the working bucket number.

According to the decision analysis, the values of the working bucket number in this period can be obtained. Then determine whether to extract the bucket number. If the working bucket number is 0, retain the original acquisition data, adjust the timing length and continue the follow-up processing such as human-computer interaction, communication processing and alarm processing. Finally, the program goes back to the data collection and continues to do the next cycle.

The above embodiments are used only to illustrate the present invention and not to be used as a limit to the present invention. As long as it is based on the technical essence of the present invention, the changes and variations of the above mentioned embodiments will all fall within the scope of the claim of the present invention.

INDUSTRIAL APPLICABILITY

The method and the device of the present invention adopt the multi-sensor fusion technology for the three kinds of pressure sensors during the shoveling-and-loading process of the loader to realize the automatic identification of the bucket number during the shoveling-and-loading process, which allows the experimenter to accurately obtain the required sample number and effectively improve and ensure the accuracy of the test data. It has a wide range of applications and has good industrial applicability.

The invention claimed is:

1. A method for identifying a number of shoveling-and-loading processes of a loader, comprising:
   1) collecting a pressure value of a working oil pump, a pressure value of a large cavity of a moving arm and a pressure value of a large cavity of a rotating bucket;
   2) fuzzifying the pressure values of the working oil pump, the pressure value of the large cavity of the moving arm, and the pressure value of the large cavity of the rotating bucket to enable the pressure value of the working oil pump, the pressure value of the large cavity of the moving arm, and the pressure value of the large cavity of the rotating bucket to be, transformed into three fuzzy quantities, the three fuzzy quantities comprising a non-working state, a state to be determined and a working state;
   3) processing the three fuzzy quantities to obtain a fusion pressure value $\hat{x}$ by weighted fusion; and
   4) processing the fusion pressure value 2 based on decision analysis to obtain a division basis of working cycles, so that the number of the shoveling-and-loading processes is obtained, wherein the step 3) comprises:
customizing a weighting factor of the pressure value of the working oil pump, the pressure value of the large cavity of the moving arm, and the pressure value of the large cavity of the rotating bucket to obtain local estimates corresponding to the pressure value of the working oil pump, the pressure value of the large cavity of the moving arm, and the pressure value of the large cavity of the rotating bucket,
processing all of the local estimates using a weighted sum to obtain a global estimate,
wherein the fusion pressure value $\hat{x}$ and the weighting factor satisfy the following rule:

$$\begin{cases} \hat{x} = \sum_{i=1}^{3} W_i x_i \\ \sum_{i=1}^{3} W_i = 1 \end{cases};$$

wherein $W_i$ represents the weighting factor of the pressure value of the working oil pump, the pressure value of the large cavity of the moving arm, and the pressure value of the large cavity of the rotating bucket.

2. The method for identifying the number of the shoveling-and-loading processes of the loader according to claim 1, wherein the step 1) comprises:
preprocessing data from the pressure value of the working oil pump, the pressure value of the large cavity of the moving arm, and the pressure value of the large cavity of the rotating bucket, wherein the preprocessing comprises:
normalizing the data, and
filtering the data.

3. The method for identifying the number of the shoveling-and-loading processes of the loader according to claim 2, wherein the normalizing comprises:
mapping an original value x of data sequence D to a value x* in an interval [0, 1] by Min-max normalization, where:

$$x^* = \frac{x - D_{min}}{D_{max} - D_{min}};$$

wherein $D_{min}$ and $D_{max}$ represent a minimum value and a maximum value of the data sequence D, respectively.

4. The method for identifying the number of the shoveling-and-loading processes of the loader according to claim 3, comprising:
processing the data obtained after the normalizing by threshold filtering,
wherein a threshold function is as follows:

$$\hat{w}_{j,k} = \begin{cases} w_{j,k}(1-u) + u^* \text{sign}(w_{j,k}) \left( |w_{j,k}| - \frac{\lambda}{1 + \exp\left( \left| \frac{w_{j,k}}{\lambda} \right|^n - 1 \right)} \right), & |w_{j,k}| \geq \lambda \\ w_{j,k}(1-u), & |w_{j,k}| < \lambda \end{cases};$$

wherein u and n represent adjustment coefficients, a value of u is in a range of [0, 1], n represents a non-zero natural number, $\lambda$ represents a threshold and is selected according to actual needs $w_{j,k}$ represents an original wavelet coefficient, and $\hat{W}_{i,k}$ represents an estimated wavelet coefficient.

5. The method for identifying the number of the shoveling-and-loading processes of the loader according to claim 1, wherein in the step 2), a fuzzy membership function used in the fuzzification process is s-type,
a formula of the fuzzy membership function is as follows:

$$A(x; a, b, c) = \begin{cases} 0, & x \leq a \\ 2\left(\frac{x-a}{c-a}\right), & a < x \leq b \\ 1 - 2\left(\frac{x-c}{c-a}\right), & b < x \leq c \\ 1, & x > c \end{cases};$$

wherein according to the fuzzy membership function and a pressure curve actually collected, values of a, b, and c are determined, a<c, $$b = \frac{a+c}{2}.$$

A(x;a,b,c) represents a fuzzy processing formula, x represents an initialization value, and a, b, c represent variable parameters, and are used to delimit fuzzy intervals.

6. The method for identifying the number of the shoveling-and-loading processes of the loader according to claim 1, comprising:
averaging the pressure value of the working oil pump, the pressure value of the large cavity of the moving arm, and the pressure value of the large cavity of the rotating bucket to determine the weighting factor, where the fusion pressure value $\hat{x}$ is as follows:

$$\hat{x} = \frac{1}{3} \sum_{i=1}^{3} x_i.$$

7. The method for identifying the number of the shoveling-and-loading processes of the loader according to claim 1, wherein the step 4) comprises:
processing the decision analysis using a fuzzy C-means clustering algorithm to obtain a cluster center value,
taking lowest two cluster center values and averaging to obtain an average value, and
during the working cycles:
clearing a time of continuous line segments lower than the average value,
determining a time of a continuous line segment higher than the average value to be a time length of the working state and the non-working state determined in each working cycle of the working cycles, and
then counting a number of the working cycles to obtain the number of the shoveling-and-loading processes.

8. The method for identifying the number of the shoveling-and-loading processes of the loader according to claim 7, comprising:
distinguishing the working state and the non-working state according to the time of the continuous line segment and the fusion pressure value $\hat{x}$.

9. A device for identifying the number of the shoveling-and-loading processes of the loader, comprising:

a microprocessor,
a pressure sensor of the working oil pump connected to the microprocessor,
a pressure sensor of the large cavity of the moving arm,
a pressure sensor of the large cavity of the rotating bucket,
a communication module,
an alarm module, and
a human-computer interaction module, wherein:
  the pressure sensor of the working oil pump, the pressure sensor of the large cavity of the moving arm and the pressure sensor of the large cavity of the rotating bucket are respectively used to collect the pressure value of the working oil pump, the pressure value of the large cavity of the moving arm, and the pressure value of the large cavity of the rotating bucket;
  the communication module is used to send information regarding the number of shoveling-and-loading processes and to set and control remote parameters;
  the alarm module is used to remind a driver after a corresponding number of the shoveling-and-loading processes has been completed;
  the human-computer interaction module is configured to enable the driver and a tester to set the number of shoveling-and-loading processes and an alarm threshold for the number of shoveling-and-loading processes; and
  the microprocessor is configured to execute the method for identifying the number of the shoveling-and-loading processes of the loader according to claim 1.

10. The device for identifying the number of the shoveling-and-loading processes of the loader according to claim 9, wherein:
  the communication module comprises three communication modes, and
  three communication modes are RS232, RS485 and CAN.

11. The device for identifying the bucket number of the shoveling-and-loading processes of the loader according to claim 9, wherein a method for operating the device comprises:
  supplying power to the microprocessor, starting to execute a program, and initializing a system of the microprocessor;
  collecting and recording data from the pressure sensor of the working oil pump, the pressure sensor of the large cavity of the moving arm, and the pressure sensor of the large cavity of the rotating bucket by the microprocessor through an analog/digital (AD) acquisition port, wherein a sampling rate of sampling is 20 Hz;
  processing the data according to a median average smoothing filter to obtain a 10 Hz pressure signal;
  evaluating the device to detect whether a timing interruption is generated or not;
  when the timing interrupt is not generated:
    entering a processing program of the human-computer interaction module,
    detecting whether a man-machine interaction is processed or not,
    when the man-machine interaction is processed, responding to the man-machine interaction, and
    when the man-machine interaction is not processed:
      entering a processing program of the communication module,
      detecting whether equipment is connected to the device and
      when the equipment is connected to the device:
        after sending a status of the device and the number of the shoveling-and-loading processes:
          entering into a processing program of the alarm module, and
          outputting corresponding alarm information; and
  when the timing interrupt is generated,
    starting to process the data,
    preprocessing and fuzzifying the 10 Hz pressure signal collected by the microprocessor to obtain multiple fuzzy values;
    processing the multiple fuzzy values by the weighted fusion to obtain a value; and
    processing the value obtained by the weighted fusion by decision analyses.

12. A method for identifying a number of shoveling-and-loading processes of a loader, comprising:
  1) collecting a pressure value of a working oil pump, a pressure value of a large cavity of a moving arm, and a pressure value of a large cavity of a rotating bucket;
  2) fuzzifying the pressure value of the working oil pump, the pressure value of the large cavity of the moving arm, and the pressure value of the large cavity of the rotating bucket to enable the pressure value of the working oil pump, the pressure value of the large cavity of the moving arm, and the pressure value of the large cavity of the rotating bucket to be transformed into three fuzzy quantities, the three fuzzy quantities comprising a non-working state, a state to be determined, and a working state;
  3) processing the three fuzzy quantities to obtain a fusion pressure value 2 by weighted fusion; and
  4) processing the fusion pressure value $\hat{x}$ based on decision analysis to obtain a division basis of working cycles, so that the number of the shoveling-and-loading processes is obtained,
wherein in the step 2), a fuzzy membership function used in the fuzzification process is s-type,
a formula of the fuzzy membership function is as follows:

$$A(x; a, b, c) = \begin{cases} 0, & x \le a \\ 2\left(\frac{x-a}{c-a}\right), & a < x \le b \\ 1 - 2\left(\frac{x-c}{c-a}\right), & b < x \le c \\ 1, & x > c \end{cases} ;$$

wherein according to the fuzzy membership function and a pressure curve actually collected, values of a, b, and c are determined, a<c, $$b = \frac{a+c}{2},$$

A(x;a,b,c) represents a fuzzy processing formula, x represents an initialization value, and a, b, c represent variable parameters and are used to delimit fuzzy intervals.

13. The method for identifying the number of the shoveling-and-loading processes of the loader according to claim 12, wherein the step 1) comprises:
preprocessing data from the pressure value of the working oil pump, the pressure value of the large cavity of the moving arm, and the pressure value of the large cavity of the rotating bucket, wherein the preprocessing comprises:
normalizing the data, and
filtering the data.

14. The method for identifying the number of the shoveling-and-loading processes of the loader according to claim 13, wherein the normalizing comprises:
mapping an original value x of data sequence D to a value x* in an interval [0, 1] by Min-max normalization, where:

$$x^* = \frac{x - D_{min}}{D_{max} - D_{min}};$$

wherein $D_{min}$ and $D_{max}$ represent a minimum value and a maximum value of the data sequence D, respectively.

15. The method for identifying the number of the shoveling-and-loading processes of the loader according to claim 14, comprising:
processing the data obtained after the normalizing by threshold filtering,
wherein a threshold function is as follows:

$$\hat{w}_{j,k} = \begin{cases} w_{j,k}(1-u) + u*\text{sign}(w_{j,k})\left(|w_{j,k}| - \frac{\lambda}{1+\exp\left(\left|\frac{w_{j,k}}{\lambda}\right|^n - 1\right)}\right), & |w_{j,k}| \geq \lambda \\ w_{j,k}(1-u), & |w_{j,k}| < \lambda \end{cases};$$

wherein u and n represent adjustment coefficients, a value of u is in a range of [0, 1], n represents a non-zero natural number, λ represents a threshold and is selected according to actual needs, $w_{j,k}$ represents an original wavelet coefficient, and $\hat{w}_{j,k}$ represents an estimated wavelet coefficient.

16. The method for identifying the number of the shoveling-and-loading processes of the loader according to claim 14, wherein the step 3) comprises:
customizing a weighting factor of the pressure value of the working oil pump, the pressure value of the cavity of the moving arm, and the pressure value of the cavity of the rotating bucket to obtain local estimates corresponding to the pressure value of the working oil pump, the pressure value of the large cavity of the moving arm, and the pressure value of the large cavity of the rotating bucket, and
processing all of the local estimates using a weighted sum to obtain a global estimate.

17. The method for identifying the number of the shoveling-and-loading processes of the loader according to claim 12, wherein the step 4) comprises:
processing the decision analysis using a fuzzy C-means clustering algorithm to obtain a cluster center value, taking lowest two cluster center values and averaging to obtain an average value, and
during the working cycles,
clearing a time of continuous line segments lower than the average value,
determining a time of a continuous line segment higher than the average value to be a time length of the working state and the non-working state determined in each working cycle of the working cycles, and
then counting a number of the working cycles to obtain the number of the shoveling-and-loading processes.

18. The method for identifying the number of the shoveling-and-loading processes of the loader according to claim 17, comprising:
distinguishing the working state and the non-working state according to the time of the continuous line segment and the fusion pressure value $\hat{x}$.

19. A method for identifying a number of shoveling-and-loading processes of a loader, comprising:
1) collecting a pressure value of a working oil pump, a pressure value of a large cavity of a moving arm, and a pressure value of a large cavity of a rotating bucket;
2) fuzzifying the pressure value of the working oil pump, the pressure value of the large cavity of the moving arm, and the pressure value of the large cavity of the rotating bucket to enable the pressure value of the working oil pump, the pressure value of the large cavity of the moving arm, and the pressure value of the large cavity of the rotating bucket to be transformed into three fuzzy quantities, the three fuzzy quantities comprising a non-working state, a state to be determined, and a working state;
3) processing the three fuzzy quantities to obtain a fusion pressure value $\hat{x}$ by weighted fusion; and
4) processing the fusion pressure value $\hat{x}$ based on decision analysis to obtain a division basis of working cycles, so that the number of the shoveling-and-loading processes is obtained,
wherein the step 1) comprises:
preprocessing data from the pressure value of the working oil pump, the pressure value of the large cavity of the moving arm, and the pressure value of the large cavity of the rotating bucket, wherein the preprocessing comprises:
normalizing the data, and
filtering the data,
wherein the normalizing comprises:
mapping an original value x of data sequence D to a value x* in an interval [0, 1] by Min-max normalization, where:

$$x^* = \frac{x - D_{min}}{D_{max} - D_{min}};$$

wherein $D_{min}$ and $D_{max}$ represent a minimum value and a maximum value of the data sequence D, respectively.

* * * * *